CORD TYPE SWITCHBOARD USING REGISTER-SENDERS

Filed July 13, 1954 7 Sheets-Sheet 1

INVENTOR.
WILLIAM A. LINDBLOOM
BY McWatters Owen
ATTY.

CORD TYPE SWITCHBOARD USING REGISTER-SENDERS

Filed July 13, 1954 7 Sheets-Sheet 2

INVENTOR.
WILLIAM A. LINDBLOOM
BY [signature]
ATTY.

Dec. 24, 1957 W. A. LINDBLOOM 2,817,713

CORD TYPE SWITCHBOARD USING REGISTER-SENDERS

Filed July 13, 1954 7 Sheets-Sheet 3

INVENTOR.
WILLIAM A. LINDBLOOM
BY Wm. Walter Owen
ATTY.

Dec. 24, 1957 W. A. LINDBLOOM 2,817,713

CORD TYPE SWITCHBOARD USING REGISTER-SENDERS

Filed July 13, 1954 7 Sheets-Sheet 4

INVENTOR.
WILLIAM A. LINDBLOOM

BY Mc Walter Owen

ATTY.

INVENTOR.
WILLIAM A. LINDBLOOM
BY Wm. Walter Owen
ATTY.

Dec. 24, 1957 W. A. LINDBLOOM 2,817,713

CORD TYPE SWITCHBOARD USING REGISTER-SENDERS

Filed July 13, 1954 7 Sheets-Sheet 6

INVENTOR.
WILLIAM A. LINDBLOOM

BY Wm. Walter Owen

ATTY.

Dec. 24, 1957 W. A. LINDBLOOM 2,817,713

CORD TYPE SWITCHBOARD USING REGISTER-SENDERS

Filed July 13, 1954 7 Sheets-Sheet 7

1ST SUB GROUP

*INVENTOR.*
WILLIAM A. LINDBLOOM

*BY* Wm. Walter Owen

ATTY.

2,817,713

CORD TYPE SWITCHBOARD USING REGISTER-SENDERS

William A. Lindbloom, Franklin Park, Ill., assignor to General Telephone Laboratories, Incorporated, a corporation of Delaware Application July 13, 1954, Serial No. 443,045

9 Claims. (Cl. 179—27)

The present invention relates to telephone systems in general and, more particularly, to improvements in switchboards of the cord circuit type provided with register-sender apparatus.

It is an object of the present invention to provide an improved arrangement for using a common group of register-senders in a multi-position cord type switchboard.

It is another object of the present invention to provide a common group of register-senders which is divided into several sub-groups in which certain positions of a multi-position switchboard are, at times, served by one of the sub-groups of register-senders and at other times served by the common group of register senders.

It is another object of the present invention to provide an improved distributor circuit for allotting register-senders for use in a multi-position cord type switchboard.

It is a further object of the present invention to provide a connecting switch with two test wipers for connecting a switchboard position with one of a group of register senders.

Referring now to the drawings comprising Figs. 1 to 5, inclusive:

Figure 1:
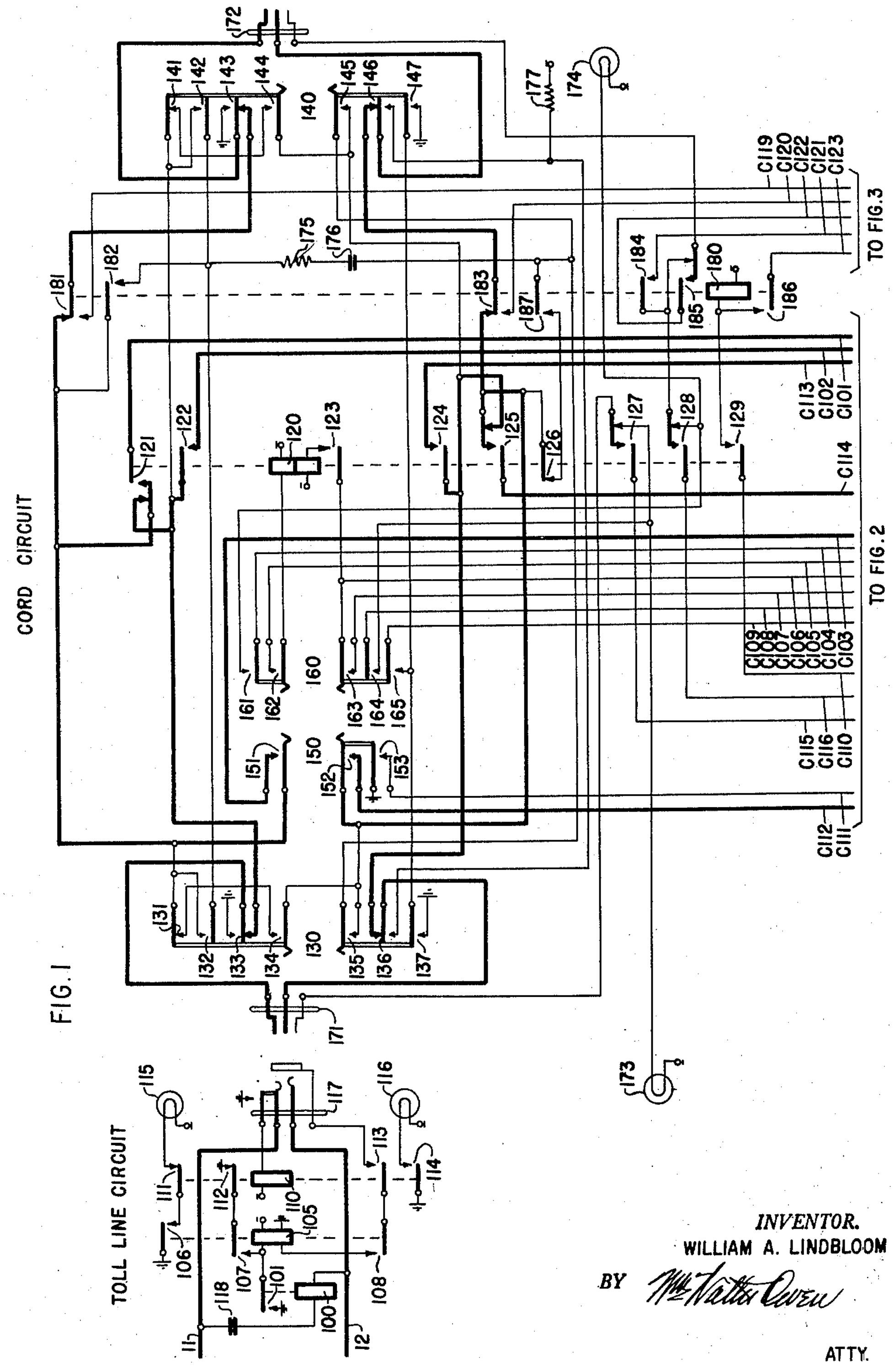
Fig. 1 shows a toll line circuit to a distant exchange and a cord circuit at a manual switchboard.
Figure 2:
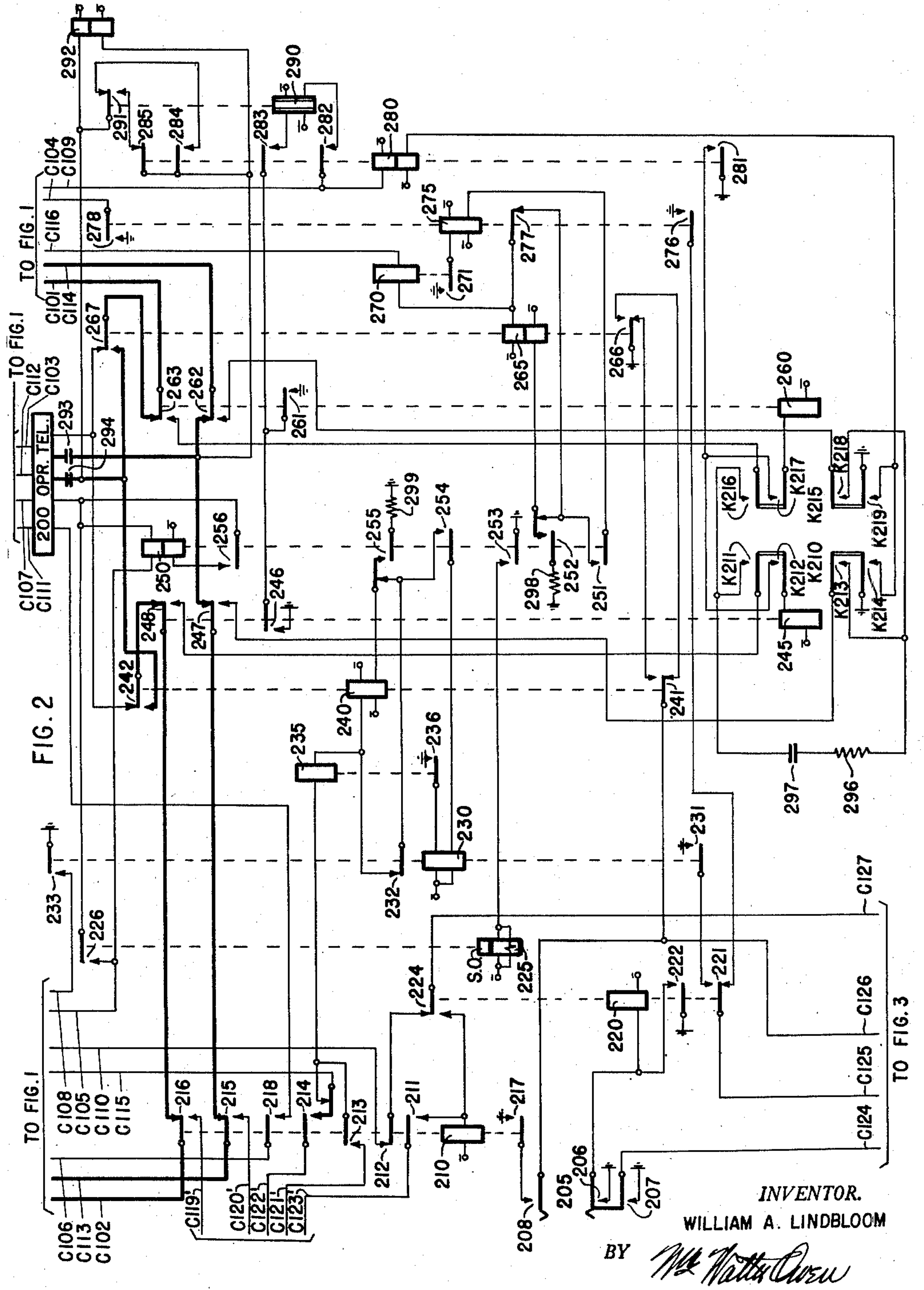
Fig. 2 shows circuits for an operator's telephone and operator's common equipment for use with the cord circuit in Fig. 1.
Figure 3:
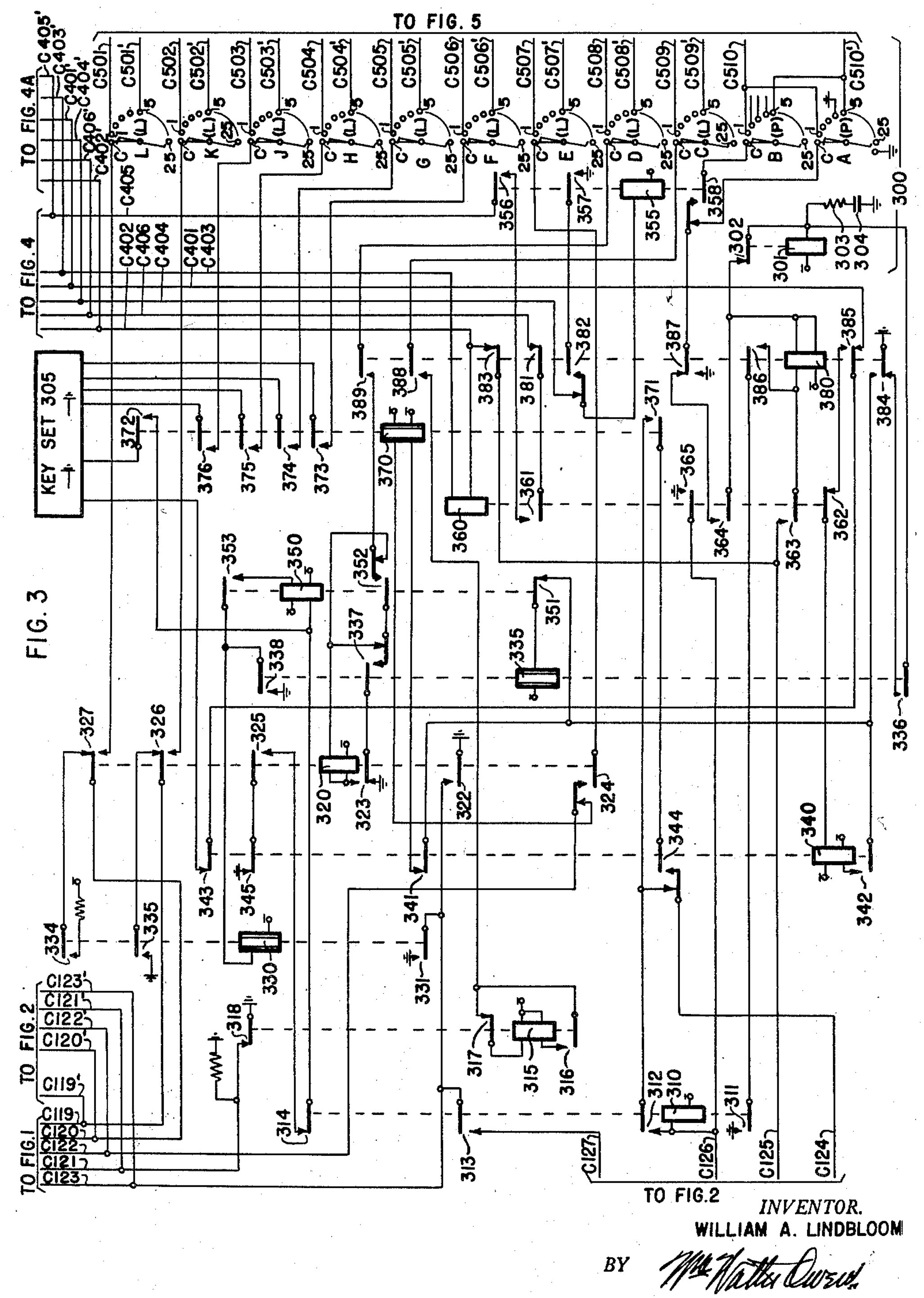
Fig. 3 shows a control circuit for connecting one of a group of register-senders to the cord in Fig. 1 and operator's equipment in Fig. 2.
Figure 4:
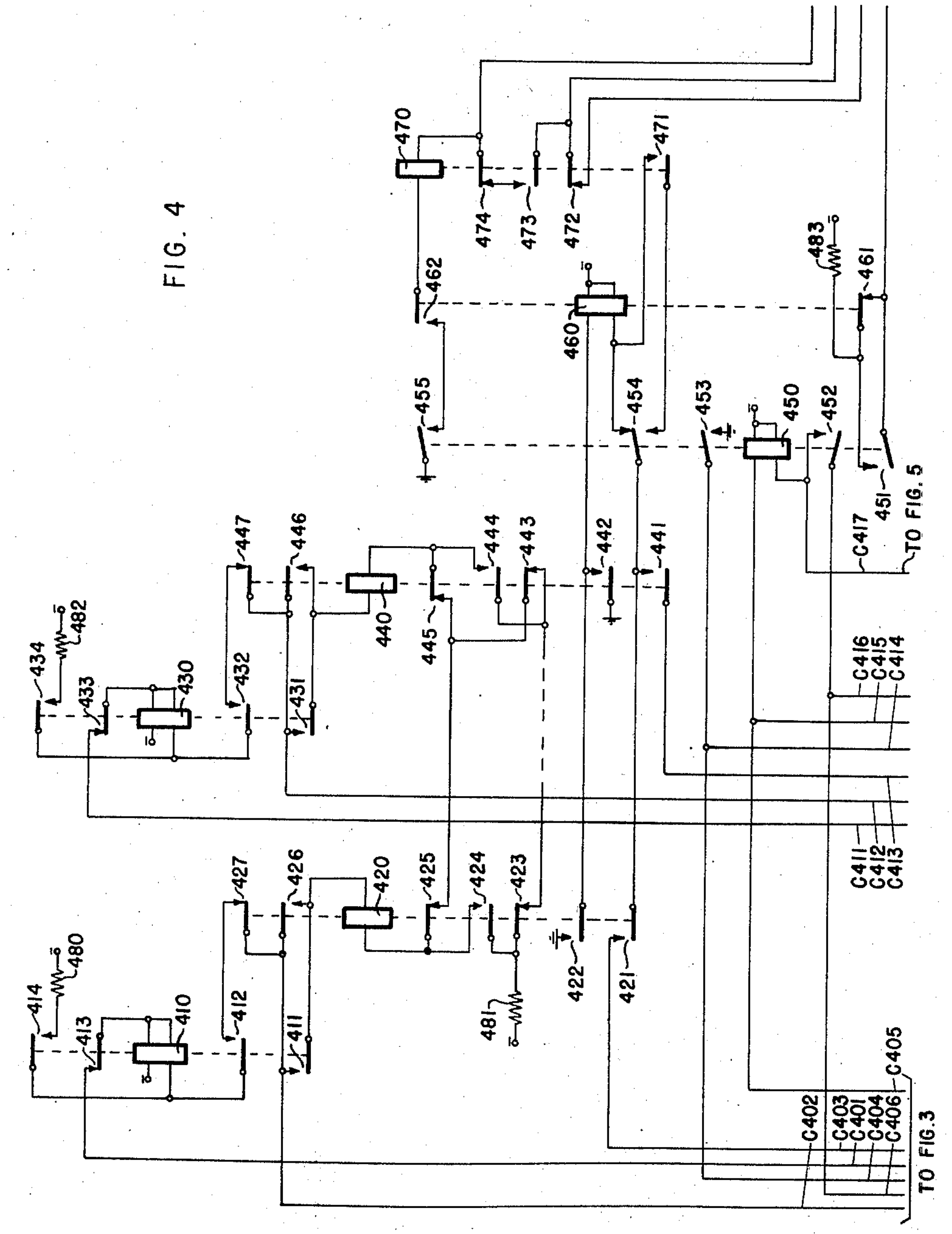
Fig. 4 shows control relays for allotting register-senders of one sub-group of register-senders to certain switchboard positions.
Figure 4A:
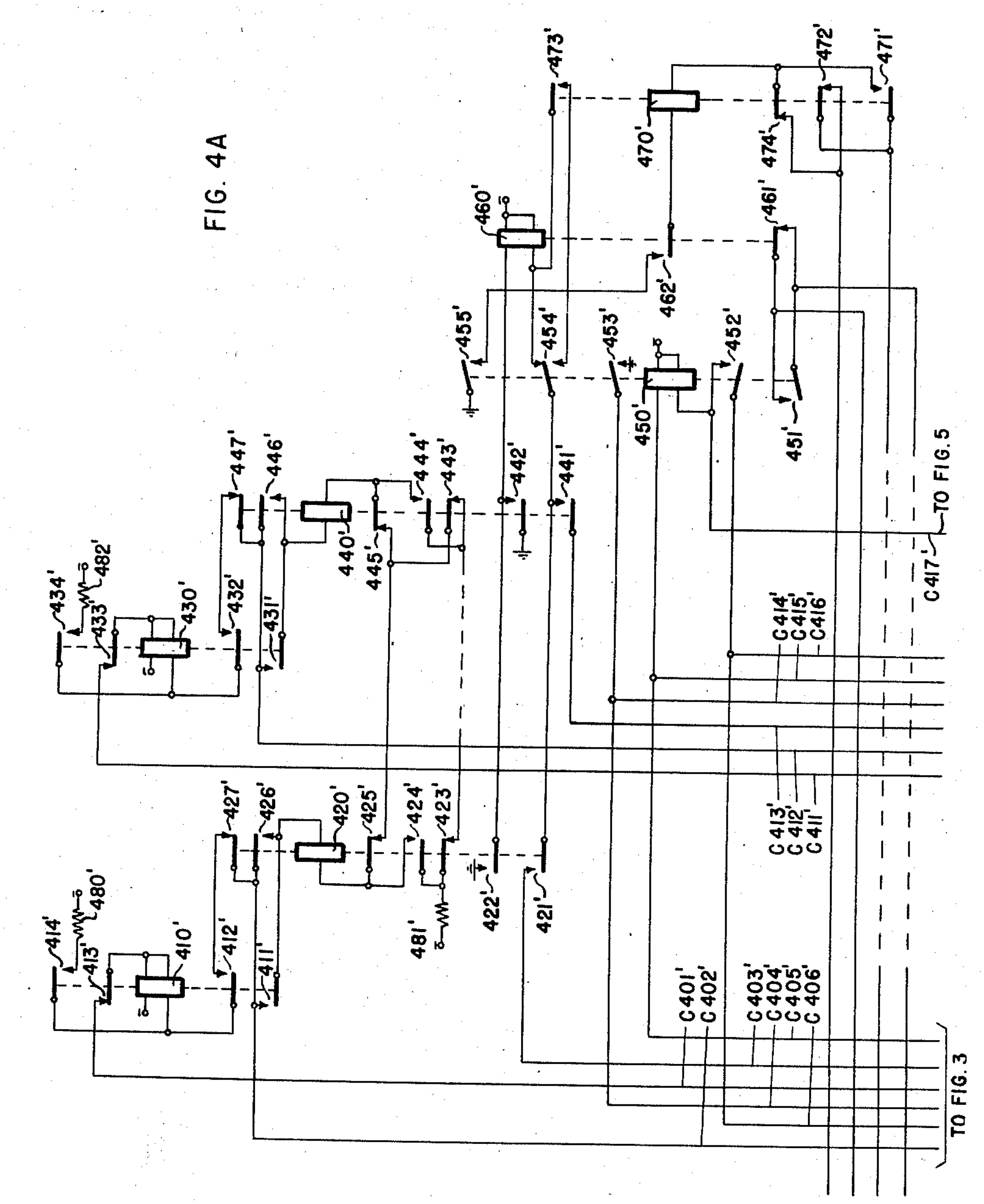
Fig. 4A shows similar control relays for allotting register-senders of another sub-group to other switchboard positions.
Figure 5:
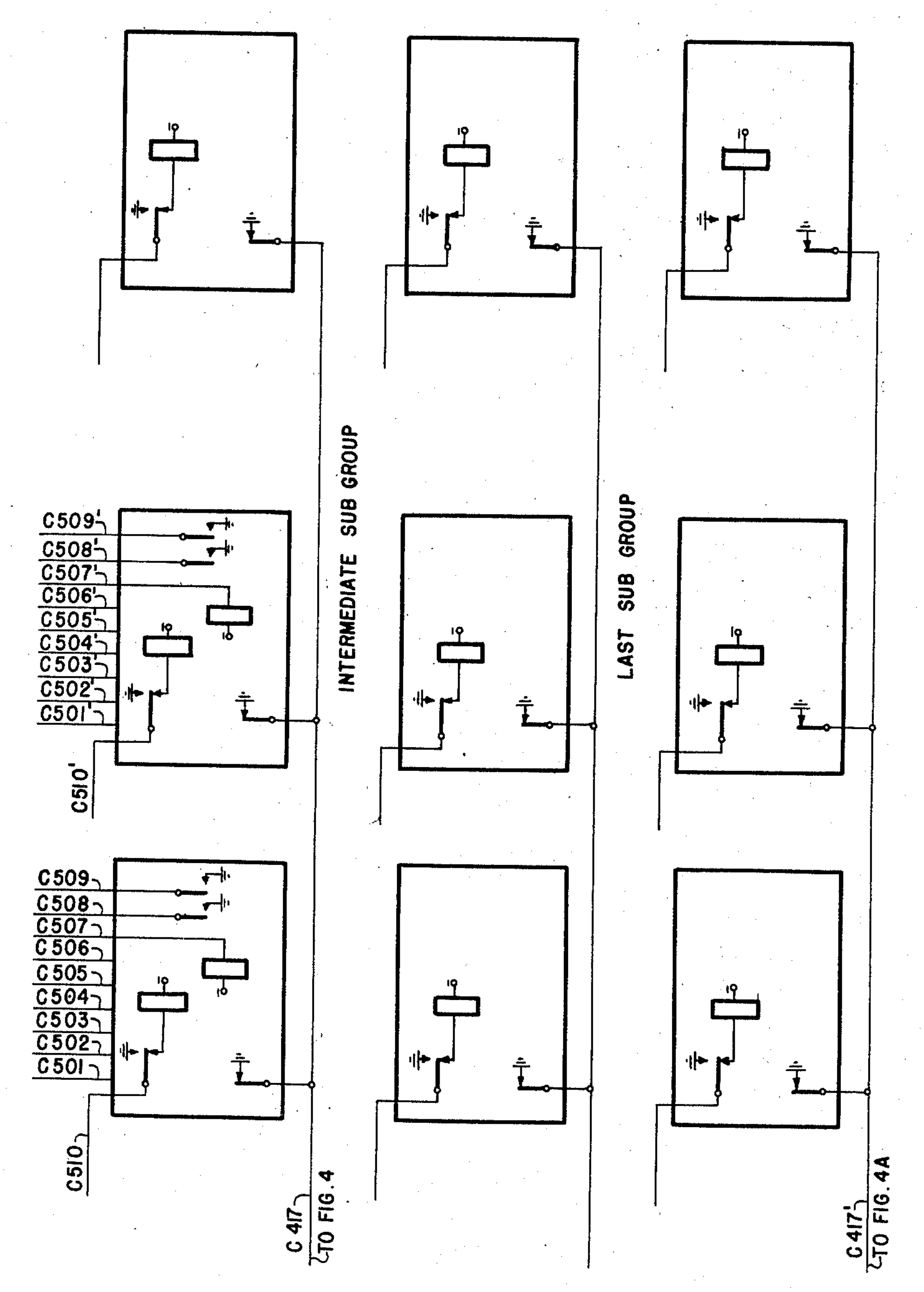
Fig. 5 shows in block diagram, a group of register-senders divided into sub-groups.

The cord circuit shown in Fig. 1 is one of a number of cord circuits at an operator's position and may be individually connected to the common equipment shown in Figs. 2 and 3, by means of the key 160 and the relays 120 and 180. The equipment shown in Figs. 1, 2 and 3 is individual to one operator's position. The switchboard comprises a number of operator's positions each equipped with a number of cords as shown in Fig. 1 and common equipment as shown in Figs. 2 and 3. The cord circuits and common equipment are connected to individual register-senders as shown in Fig. 5, through the wipers and bank contacts of rotary switches, such as the rotary switch 300, under control of relays shown in Figs. 4 and 4A. The control relays in Figs. 4 and 4A are arranged to cause the rotary switches 300 to test for idle register-senders over the A bank contacts as long as there is an idle register-sender in the sub-group to which the A bank contacts are connected. When all of the register-senders in this sub-group become busy the control relays of Figs. 4 and 4A operate to cause the rotary switches 300 to test for idle register-senders over the B bank contacts which are connected to all of the register-senders of the common group of register-senders. Thus a particular operator's position is normally served by a sub-group of register-senders. If all of the register-senders in this sub-group become busy the operator's position is served by all of the register-senders of the common group.

The cord circuits shown in Fig. 1 and the common equipment shown in Figs. 2, 3 and 4 are suitable for use in systems such as the system shown in U. S. Patent 2,511,145, issued June 13, 1950, to H. W. Balzer. The register-senders shown in Fig. 5 are the same as the register-sender shown in Patent 2,511,145 which may be seen for a detailed description of them. Outgoing trunk circuits suitable for use with automatic switches and with the cord circuits of Fig. 1 are the same as those shown in the aforementioned Balzer patent.

In Patent 2,511,145 the register-senders are connected directly to the operator's common equipment. In the present invention the rotary switch 300 (Fig. 3) connects the operator's common equipment to any idle one of a group of register senders. Furthermore the register-senders are divided into sub-groups, which, through control relays 410, 420 and 450 (Fig. 4) and relay 355 and wipers and bank contacts A and B (Fig. 3) determine whether the operator's common equipment shall be connected to a register-sender in a sub-group or to any register-sender in the main group of register-senders.

Each operator's position has a position circuit, Fig. 2, a sender control circuit, Fig. 3, and a pair of chain relays 410 and 420 through which they are associated with a pair of control relays 460 and 470. The register-senders are divided into four sub-groups each sub-group having an all register-senders busy relay such as the relay 450. Each operator's position which will normally use the register-senders of a sub-group have a pair of chain relays similar to relays 410 and 420. Only the first and last sets of chain relays have been shown. However, for a sub-group of six register-senders eight or more operator's positions would be normally asociated as a group through their chain relays and would connect with register-senders in the sub-group as long as an idle register-sender was available in the sub-group. As long as one of the chain relays such as 420 or 440 serving a group of operator's positions is operated no other chain relay in the group can be operated. Thus only one idle register-sender in a sub-group can be searched for at one time.

As shown in Fig. 4A another sub-group of register-senders can be associated with another group of operator's positions. Similar chain and all register senders busy relays would be supplied for each sub-group of senders. An idle register-sender in each sub-group can be searched for at any time that an operator's position having first choice to the register-senders of the sub-group requires the use of a register-sender.

When a call is made through the cord circuit of Fig. 1 over a trunk circuit on which impulsing is to take place plug 172 is inserted in a jack, such as jack 17, and key 160 and relays 120 and 180 are operated. Ground through armature 318 over conductor C121, armature 184, armature 128, conductors C116 through relay 270 and relay 265 to battery causes relay 270 to operate and energize relay 275 at armature 271. Relay 275 operates its armatures, the armature 276 connecting ground through armature 221 over conductor C125, through armature 383 to one terminal of relay 360 and over conductor C402 to armatures 411, 412 of relay 410 and to armatures 426 and 427 of relay 420.

In Fig. 5 the conductor C417 is connected to each register-sender of a sub-group of register-senders. Each of the register-senders, when in an idle condition, connects ground to conductor C417. When none of the register-senders of the sub-group are idle, ground is removed from conductor C417, opening a circuit to the lower winding of relay 450.

Figure 3A:
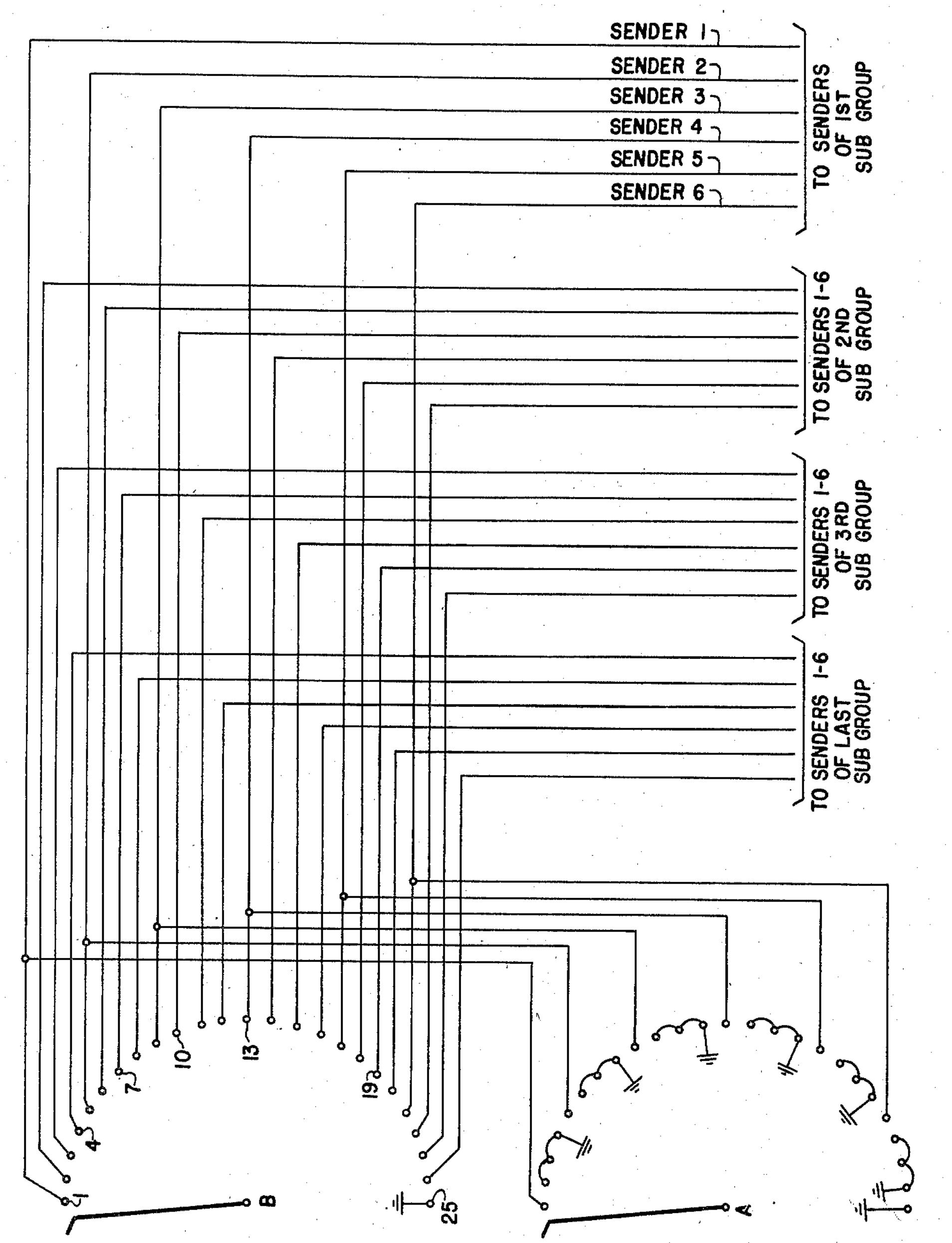
Fig. 3A shows, in detail, the wiring of banks A and B of rotary switch 300.

Assuming now that the relay 450 is operated by ground on conductor C417 and that ground is connected to conductor C402 by the operation of key 160, and relays 120 and 180, the operator operates a start key in the key set 305 connecting ground through armatures 343 and 385 over conductor C401 to the upper winding of relay 410. The relay 410 operates armature 412 only as its lower winding is short circuited by ground from conductors C401 and C402. When the operator releases the start key in key set 305 ground is removed from conductor C401 and the upper and lower windings of relay 410 are energized in series from ground on conductor C402 through armature 412. Relay 410 operates in full and at armature 411 closes a circuit to relay 420 which may be traced through armature 425, armature 443 and through similar armatures in intermediate control circuits, through armature 423 to battery through resistor 481. Relay 420 operates and connects battery through the lower winding of relay 460, armature 454, armature 421, conductor C403 to the left terminal of relay 360. As previously described ground is connected to the other terminal of relay 360 and relay 360 now operates. At armature 364 the motor magnet 301 of rotary switch 300 is connected to the A wiper, and conductor C125 is connected to relay 380 through armature 363. When register-senders are in use the leads which are connected to the bank contacts associated with the A and B wipers are connected to ground. In this case, as the A wiper is connected to the motor magnet 301, if the A wiper is resting on a ground connected bank contact the motor magnet will be energized and will open its interrupter springs 302 and will advance the wipers to the next set of bank contacts. Ground from the wiper A through armature 364 maintains a short circuit on relay 380 to prevent it from operating at this time. As may be seen in Fig. 3A only every fourth contact associated with wiper A is connected to a register-sender and as the relay 450 is operated at least one of these register-senders is idle. The rotary switch 300 will rotate until the wiper A is stepped onto a bank contact associated with an idle register-sender. At this time ground will not be encountered by wiper A, the short circuit will thus be removed from relay 380 and relay 380 will operate from ground on conductor C125. Relay 380 at armature 387 disconnects motor magnet 301 from wiper A to stop the rotary switch, opens the circuit to relay 360 at armature 383 and also disconnects ground from conductor C402 to allow relays 410 and 420 to restore and thus permit other positions to be connected to other idle finders in the sub-group.

Relay 380 at armature 384 energizes relay 370 which at armatures 373 to 376, inclusive, connects the key set 305 to wipers F, G, H and J and through conductors C506, C505, C504 and C503 to the register-sender. The operator may now manipulate the key set 305 to set the registers of the register-sender in accordance with the desired codes, the controls being extended over conductors C503 to C506, inclusive. The register-sender when seized returns a ground over conductor C508 which through wiper D and armature 389 energizes the relay 320. Relay 320 at armatures 326 and 327 connects the wipers K and L of the rotary switch 300 to conductors C119 and C120 which through armatures 181 and 183 respectively are connected to the trunk circuit through the upper and the center conductors of plug 172. Impulses from the register-sender over conductors C502 and C501 will be transmitted through wipers K and L and the previously traced circuits to the connected trunk circuit. The relay 320 at armature 321 connects ground to armature 386 to hold relay 380. Relay 180 is held over conductor C123 from ground at armature 322.

The operator after having registered the desired code in the register-sender may restore the key 160 and allow the relay 120 to release. When the register-sender has sent all the digits registered in it ground is disconnected from conductor C508 opening the circuit to relay 320. Relay 320 releases and at armature 321 opens the circuit to relay 380 and at armature 322 opens the circuit to relay 180. Relay 180 on restoring prepares Fig. 3 for use in connecting other register-senders to the operator's position. Relay 180 on restoring disconnects the cord circuit, Fig. 1, from Fig. 3 and connects two ends of the cord circuit together.

If all of the register-senders in a sub-group are busy ground is disconnected from a conductor such as conductor C417. Assuming that this condition occurs in the sub-group connected to conductor C417, the lower winding of relay 450 is deenergized and the relay 450 releases. Armature 452 connects the lower winding of relay 450 to conductor C406, armature 453 connects ground to conductor C404 and armature 454 disconnects the lower winding of relay 460 from armature 421. Ground on conductor C404 operates relay 355 which at armature 358 disables the incomplete testing circuit over wiper A and prepares a circuit over wiper B. Should the operator at this position plug a cord circuit such as the cord circuit of Fig. 1 into a trunk jack and operate the key 160 the relays 120 and 180 operate and ground will be connected to conductor C402 and one terminal of relay 360 as previously described. Momentary ground from the start key of the key set over conductor C401 operates relays 410 and 420 as previously described. Ground through armature 422 causes relay 460 to operate. Relay 460 connects ground from armature 455 through armature 462 to relay 470 through armature 472′ and similar armatures on the control relays for other sub-groups of register-senders through armature 472, through armature 461′ and similar armatures on the control relays for other sub-groups of register-senders, through armature 451 to battery through resistor 483. Relay 470 operates and connects battery through the lower winding of relay 460 through armatures 471, 454 and 421 to conductor C403, energizing relay 360. Relay 360 connects wiper B through armatures 358 and 364 and interrupter contacts 302 to motor magnet 301. The rotary switch 300 now hunts for any idle register-sender accessible to it. When an idle register sender is found relays 380 and 320 operate as previously described. Relay 380 at armature 382 closes a holding circuit to relay 355 from ground through armature 357, and disconnects relay 355 from conductor C404. Relay 355 remains operated until the register-sender releases relays 320 and 380. At this time relay 355 is connected to C404 and if relay 450 is operated ground will not be encountered on C404 and relay 355 will release. Should another call be originated by this position the rotary switch 300 will test for an idle register-sender in the sub-group connected in the bank contact associated with the wiper A. It may be noted that when relays 355 and 360 are operated the upper winding of relay 450 over conductor C405 through armatures 356, 361 and 381 over conductor C406 through armature 452 is connected to the lower winding of relay 450 and to conductor C417. The two windings of relay 450 are connected differentially at this time so that if a register-sender in the sub-group connected to conductor C417 becomes idle at this time and connects ground to C417 while relays 355 and 350 are operated relay 450 will not operate. When an idle register-sender is encountered by the rotary switch 300 the relay 380 operates and opens the connection between the upper and lower windings of relay 450. The lower winding of relay 450 being energized alone causes relay 450 to operate its armatures so that any position which is normally served by the sub-group of finders connected to conductor C417 will test over wipers similar to the A wiper for an idle register-sender in the sub-group.

Register senders may be connected to cord circuits such as shown in Fig. 1 over conductors C119′ to C123′, inclusive, through Fig. 2 and the armatures of relay 210. When connection is made in this manner impulses are transmitted over the conductors of plug 171 to a trunk circuit to which plug 171 is connected. Key 206, relay 210 and relay 220 are provided for connecting register-senders to the plug 171. The operation of the control equipment in Figs. 3 and 4 is substantially the same as when register-senders are connected to plug 172.

Relay 310 is energized from ground over conductor C126 through armatures 266 and 241 when key 160 and relay 120 of a cord circuit are operated and either plug 171 or 172 is inserted in the jack of a trunk suitable for use with a register-sender. Relay 310 operates, prepares a holding circuit for relay 380 at armature 311, prepares a holding circuit for itself at armature 312, prepares a circuit for operating relay 210 if key 205 and relay 220 are operated, and opens part of an incomplete circuit to relay 350 at armature 314.

The relay 380 operates as soon as the rotary switch 300 connects with an idle register-sender. Ground from armature 384 through armature 351 operates relay 335 and through armature 341 operates relay 370. Relay 370 as previously described connects key set 305 to rotary switch 300 and it also connects a winding of the relay 350 to key set 305. The operator may now connect ground to the winding of relay 350 causing it to operate. At armature 352 the circuit to the register-sender over conductor C508 and wiper D is transferred from the upper winding of relay 320 through armature 337 to either the lower winding of relay 320 or to direct ground. The resistance in the lower winding of relay 320 is different than the resistance of the upper winding and either this change or the connection of direct ground, depending on whether armature 323 is normal or operated, will cause the register-sender to restore to normal so that the operator can set up an entirely new code in it.

Relay 350 in operating closes a holding circuit for itself at armature 353 to armature 338 and opens the circuit to relay 335 at armature 351. Relay 351 restores, opens a circuit to relay 350 at armature 338 and transfers conductor C508 to the upper winding of relay 320 at armature 337. If the operator has removed ground from the lower winding of relay 350 relay 350 restores and closes the circuit to relay 335 at armature 351. Relay 335 operates and the upper winding of relay 320 remains connected to conductor C508 through the normally closed contact associated with armature 352.

In case a register-sender is connected to plug 172 through contacts of relay 180 and the operator has set up the complete code in the register-sender, the operator may operate the start key in the key set connecting ground through armatures 343, 385 and 362 to the upper winding of relay 340. Relay 340 operates its armature 342 which energizes its lower winding from ground at armature 384 and causes relay 340 to operate the rest of its armatures. At armature 341 the circuit to relay 370 is opened allowing 370 to release and disconnect key set 305 from rotary switch 300. At armature 345 part of an incomplete circuit to relay 350 is opened. The operator may now restore the key 160 allowing relays 120 and 310 to release. If the operator restores key 160 without causing the operation of relay 340 ground from armatures 345, 325 and 314, after relay 310 releases, will operate relay 350 and cause the register-sender to restore to normal.

Having described my invention, what is considered to be new and is desired to be protected by Letters Patent will be set forth in the following claims.

What is claimed is:

1. In a telephone system, a plurality of groups of register-senders, an operator's position, means for connecting said operator's position to any one of said register-senders, a first test lead, means including said first test lead for controlling the connection of said operator's position to any one of said register-senders, a second test lead, means including said second test lead for controlling the connection of said operator's position to a register-sender of one of said groups of register-senders, operating means controlled jointly by the register-senders of said one group, means for operating said operating means, and means controlled by said operating means for selecting said first test lead or said second test lead for controlling the connection of said operator's position to a register-sender.

2. In a telephone system, a first group of register-senders, a second group of register-senders, a group of operator's positions, control means for connecting a register-sender of said first group to one of said operator's positions and for preventing the connection of a register-sender of said second group to any one of said operator's positions, means controlled by the register-senders of said first group for disabling said control means, said means effective with said control means disabled for connecting a register-sender of said second group to one of said operator's positions.

3. In a telephone system, a plurality of register-senders, an operator's position, a switch in said operator's position, terminals for each of said register-senders in said switch, a first test conductor having access to terminals of certain ones of said register-senders, a second test conductor having access to terminals of all of said plurality of register senders, operator controlled means for causing said switch to connect with the terminals of one of said register-senders, control means for causing said switch to be controlled by said first test conductor to connect with the terminals of one of said certain ones of said register-senders, means operated jointly by all of said certain ones of said register-senders for disabling said control means and for causing said switch to be controlled by said second test conductor to connect with the terminals of one of said plurality of register-senders.

4. In a telephone system, a plurality of groups of register-senders, a plurality of operator's positions, means for connecting said operator's positions to said register-senders, control means normally effective for causing said operator's positions to connect with register-senders of one of said groups, means for operating said control means, and means effective with said control means operated for causing said operator's positions to connect with register-senders of any of said groups.

5. In a telephone system, a group of register-senders, other register-senders, an operator's position, a switch for connecting said operator's position with any one of said register-senders, a first test wiper on said switch, test contacts for each register-sender in said group accessible to said first test wiper, a second test wiper on said switch, test contacts for each register-sender in said group and for each of said other register-senders accessible to said second test wiper, means including said first test wiper for moving said first test wiper to a test contact of an idle register-sender in said group, a relay, means for operating said relay in case all of the register-senders of said group are busy, and means including said second test wiper for moving said second test wiper to a test contact of any idle one of said register senders in case said relay is operated.

6. In a telephone system, a plurality of groups of register-senders, a plurality of groups of operator's positions, a pair of relays for each operator's position, a switch for each operator's position, terminals for each register-sender in each of said switches, means including the two relays for each operator's position for simultaneously operating one switch in each group of operator's positions to the terminals of register-senders, control means operated responsive to all of the register-senders of one of said groups becoming busy, and means including said control means and the two relays for each of said operator's positions for preventing operation of any of the switches for the operator's positions of one of said groups of operator's positions in case a switch for any operator's position in any of said other groups of operator positions is being operated.

7. In a telephone system, a cord circuit, a rotary switch, two groups of register-senders, operator controlled means for connecting said cord circuit to said rotary switch and for connecting said rotary switch to one of said register-senders, a circuit for operating said rotary switch, a first control wiper on said rotary switch, means normally effective for connecting said first control wiper in said circuit to control the connection of said cord circuit to a register-sender of one of said groups of register-senders, a second control wiper on said rotary switch, control means for disconnecting said first control wiper from said circuit and for connecting said second control wiper to said circuit, means controlled jointly by all of the register-senders in said one group for operating said control means, and means including said second control wiper for controlling the connection of said cord circuit to a register-sender in either of said two groups.

8. In a telephone system, a first group of register-senders, other register-senders, a first switch having contacts terminating each of said register-senders other switches having contacts terminating each of said register-senders, a relay, means for operating said relay, means responsive to the operation of said relay for operating said first switch to the contacts of a register-sender of said first group, contacts on said relay effective in case said relay is operated for preventing the operation of any of said other switches, control means operated in case all the register-senders of said first group are busy, and means including said relay for operating said first switch to contacts of one of said other register-senders in case said control means is operated.

9. In a telephone system, a first group of register-senders, a second group of register-senders, other register-senders, a first group of switches having access to contacts terminating each of said register-senders, a second group of switches having access to contacts terminating each of said register-senders, means for concurrently connecting a switch of said first group to a register-sender of said first group and for connecting a switch of said second group with a register-sender of said second group, said means including a first relay comon to said first group of switches and operable under control of any idle one of said first group of register-senders and a second relay common to said second group of switches and operable under control of any idle one of said second group of register-senders, means effective in case all of the register-senders of a group are busy for releasing the relay common to the corresponding group of switches, and means effective with said relay released for connecting a switch of said corresponding group to any idle one of said register-senders.

References Cited in the file of this patent

UNITED STATES PATENTS

| | | |
|---|---|---|
| 2,566,010 | Wicks | Aug. 28, 1951 |
| 2,636,947 | Michael | Apr. 28, 1953 |